United States Patent
Alharayeri

(10) Patent No.: US 10,334,397 B2
(45) Date of Patent: *Jun. 25, 2019

(54) INTERACTION TRACKING AND ORGANIZING SYSTEM

(71) Applicant: WIRELESS DISCOVERY LLC, Los Gatos, CA (US)

(72) Inventor: Ramzi Alharayeri, San Jose, CA (US)

(73) Assignee: WIRELESS DISCOVERY LLC, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,384

(22) Filed: Nov. 2, 2017

(65) Prior Publication Data

US 2018/0070208 A1 Mar. 8, 2018

Related U.S. Application Data

(63) Continuation-in-part of application No. 15/136,842, filed on Apr. 22, 2016, which is a continuation of
(Continued)

(51) Int. Cl.
*H04W 24/00* (2009.01)
*H04W 4/02* (2018.01)
(Continued)

(52) U.S. Cl.
CPC .......... *H04W 4/023* (2013.01); *G06F 16/275* (2019.01); *G06F 16/29* (2019.01);
(Continued)

(58) Field of Classification Search
CPC ........... H04W 4/02; H04W 4/12; H04W 8/18; H04W 48/16; H04W 64/00; H04W 84/18;
(Continued)

(56) References Cited

U.S. PATENT DOCUMENTS 6,178,511 B1  1/2001  Cohen et al.
6,243,816 B1  6/2001  Fang et al.
(Continued)

FOREIGN PATENT DOCUMENTS

DE  10149496 A1  4/2003
EP  1450282 A2  8/2004
WO  PCTUS0930756  1/2009

OTHER PUBLICATIONS

Malley, A., "Apple seeks distance-based pairing, auto contact data patents," Webpage: http://appleinsider.com/articles/08/09/27/apple_seeks_distance_based_pairing_auto_contact_data_patents, published on Sep. 27, 2008, 2 pages.
(Continued)

*Primary Examiner* — Anthony S Addy
*Assistant Examiner* — Matthew W Genack
(74) *Attorney, Agent, or Firm* — Rahman LLC

(57) ABSTRACT

A server that cross-references a first user's device location with registered members in a spatial proximity of the first user's device and returns the results by disclosing personal user attributes including pictures and names of all members in the spatial proximity of the first user's device. The first user who initiated the inquiry may select from the results returned any discovered user he/she wishes to connect with and send a form of invitation to connect using network available tools such as email, SMS, text or any customized invitation form. The invitation to connect to the inquiring user includes his/her personal attributes including a picture and name. The discovered member who received the invitation may accept, ignore, or decline connecting with the inquiring user. The first user may also receive an invitation from the server to accept, ignore, or decline connecting with the discovered member.

15 Claims, 11 Drawing Sheets

Related U.S. Application Data application No. 15/000,960, filed on Jan. 19, 2016, now Pat. No. 9,357,352, which is a continuation-in-part of application No. 14/570,779, filed on Dec. 15, 2014, now Pat. No. 9,264,875, which is a continuation-in-part of application No. 12/351,654, filed on Jan. 9, 2009, now Pat. No. 8,914,024.

(60) Provisional application No. 61/010,891, filed on Jan. 10, 2008.

(51) Int. Cl.

| | | |
|---|---|---|
| *H04L 12/58* | (2006.01) | |
| *H04L 29/08* | (2006.01) | |
| *H04W 8/18* | (2009.01) | |
| *H04W 4/08* | (2009.01) | |
| *H04W 76/00* | (2018.01) | |
| *H04W 4/21* | (2018.01) | |
| *G06F 16/29* | (2019.01) | |
| *G06F 16/27* | (2019.01) | |
| *H04L 29/06* | (2006.01) | |
| *H04W 12/08* | (2009.01) | |
| *G06F 16/9537* | (2019.01) | |
| *H04W 84/18* | (2009.01) | |
| *H04L 29/12* | (2006.01) | |
| *H04W 8/00* | (2009.01) | |

(52) U.S. Cl.
CPC .......... *G06F 16/9537* (2019.01); *H04L 51/00* (2013.01); *H04L 51/20* (2013.01); *H04L 51/32* (2013.01); *H04L 51/36* (2013.01); *H04L 51/38* (2013.01); *H04L 63/102* (2013.01); *H04L 67/28* (2013.01); *H04L 67/306* (2013.01); *H04W 4/08* (2013.01); *H04W 4/21* (2018.02); *H04W 8/18* (2013.01); *H04W 12/08* (2013.01); *H04W 76/00* (2013.01); *H04L 61/1594* (2013.01); *H04W 8/005* (2013.01); *H04W 84/18* (2013.01)

(58) Field of Classification Search
CPC ............. H04W 88/06; H04L 29/08657; H04L 29/08108
USPC .. 455/41.2, 412.2, 414.1, 426.1, 423.3, 434, 455/456.3
See application file for complete search history.

(56) References Cited

U.S. PATENT DOCUMENTS

| | | |
|---|---|---|
| 7,249,182 B1 | 7/2007 | Heinonen et al. |
| 7,296,036 B2 | 11/2007 | Celik |
| 7,310,515 B2 | 12/2007 | Enderlein et al. |
| 7,346,855 B2 | 3/2008 | Hellyar et al. |
| 7,353,462 B2 | 4/2008 | Caffarelli |
| 8,472,874 B2 | 7/2013 | Tang et al. |
| 8,606,854 B2 | 12/2013 | Serlet |
| 2004/0009750 A1 | 1/2004 | Beros et al. |
| 2004/0113807 A1 | 6/2004 | Amram et al. |
| 2005/0026594 A1 | 2/2005 | Miller et al. |
| 2005/0053206 A1* | 3/2005 | Chingon ............... H04M 1/573 379/88.19 |
| 2005/0076124 A1 | 4/2005 | Enderlein et al. |
| 2005/0193093 A1 | 9/2005 | Mathew et al. |
| 2005/0281237 A1 | 12/2005 | Heinonen et al. |
| 2006/0062356 A1 | 3/2006 | Vendrow et al. |
| 2006/0063548 A1 | 3/2006 | Kim |
| 2006/0161599 A1 | 7/2006 | Rosen |
| 2006/0234631 A1 | 10/2006 | Dieguez |
| 2006/0281447 A1* | 12/2006 | Lewis ............... H04M 3/42042 455/418 |
| 2007/0021111 A1 | 1/2007 | Celik |
| 2007/0167136 A1 | 7/2007 | Groth |
| 2007/0168425 A1 | 7/2007 | Morotomi |
| 2007/0229350 A1* | 10/2007 | Scalisi .................... G06F 21/35 342/350 |
| 2007/0242814 A1 | 10/2007 | Gober |
| 2007/0260751 A1 | 11/2007 | Meesseman |
| 2008/0051033 A1 | 2/2008 | Hymes |
| 2008/0108308 A1 | 5/2008 | Ullah |
| 2008/0140640 A1 | 6/2008 | Raff |
| 2008/0270425 A1* | 10/2008 | Cotgreave ......... G06F 17/30247 |
| 2009/0209202 A1* | 8/2009 | Martini ................ H04W 12/02 455/41.2 |

OTHER PUBLICATIONS

Dating DNA tutorial video, iPhone App, http://www.datingdna.com:80/public/help/tutorials/tutorial9.html, 3 minutes, 57 seconds video, Dating DNA, LLC, Dec. 16, 2008, 1 page print out of webpage.

\* cited by examiner

INTERACTION TRACKING AND ORGANIZING SYSTEM

CROSS-REFERENCE TO RELATED APPLICATIONS

This application is a continuation-in-part of U.S. application Ser. No. 15/136,842, filed on Apr. 22, 2016, which is a continuation of U.S. application Ser. No. 15/000,960, filed on Jan. 19, 2016, now U.S. Pat. No. 9,357,352, issued on May 31, 2016, which is a continuation-in-part of U.S. application Ser. No. 14/570,779, filed on Dec. 15, 2014, now U.S. Pat. No. 9,264,875, issued on Feb. 16, 2016, which is a continuation-in-part of U.S. application Ser. No. 12/351,654, filed on Jan. 9, 2009, now U.S. Pat. No. 8,914,024, issued on Dec. 16, 2014, which claims the benefit to U.S. Provisional Application No. 61/010,891 filed on Jan. 10, 2008, the complete disclosures of which, in their entireties, are herein incorporated by reference.

BACKGROUND

Technical Field

The embodiments herein generally relate to an interaction tracking and organizing system and, in particular, to the establishment of social connections and exchange of electronic coordinates card (also known as contact information card) via the short-range wireless communications.

Description of the Related Art

The usage or access of the social networks on the communication devices has increased tremendously. With such increase in the use of communication devices for accessing social networks, the users of the communication devices are feeling a need of exchanging contact information, including pictures, social network profiles, emails, and phone numbers, for enhancing social interaction.

SUMMARY

In view of the foregoing, an embodiment herein provides a server configured to communicate with a first communication device of a first user and a second communication device of a second user over communication links comprising a cellular network; store in a database a first profile associated with the first user and a second profile associated with a second user, both the first and the second profile comprising at least a picture and a name of their respective users; automatically determine based on wireless communication that the first communication device and the second communication device are coincidently located within a spatial proximity to one another; responsive at least to the first communication device and the second communication device coincidently located in a spatial proximity, send to the first communication device a first information about the second profile and send to the second communication device a second information about the first profile, wherein the first communication device displays on a first screen a first invitation comprising at least a picture and name from the second profile and the second communication device displays on a second screen a second invitation comprising at least picture and name from the first profile, wherein the first communication device is configured to receive a first input from the first user if he is willing to accept the first invitation and the second communication device is configured to receive a second input from the second user if he is willing to accept the second invitation; receive a first response from the first communication device representing the first input; receive a second response from the second communication device representing the second input; and responsive to both the first and the second input being positive, store information in the database that the first and the second users are now contacts of each other, and if such information is stored in the database, enable the first user and the second user to communicate using the first and the second communication devices.

The server may be configured to provide to communication device associated with users who are contacts with the first user information about the first user beyond information in the first invitation. The server may communicate with a networking device, and wherein the networking device is to provide social networking services that operates independently of the server. The server may receive profile related information from the networking device. The server may connect with a contact exchanging application executing on the first and second communication devices to execute services and features available with the server. The contact exchanging application may store updated contact information and profiles of user contacts including pictures. The server may utilize the contact exchanging application of the first communication device to discover the second communication device present within the spatial proximity thereof, and to present a picture and name of the second user associated with the second communication device on a user interface of the first communication device before the first user deciding to send an invite to connect. The contact exchanging application may present the second user with an option to accept or reject the invitation sent by the first user by sending to the server the acceptance or rejection response of the second user, and allowing the server to communicate the acceptance or rejection response to the first user.

Another embodiment provides a method comprising communicating a server with a first communication device of a first user and a second communication device of a second user over communication links comprising a cellular network; storing, in the database, a first profile associated with the first user and a second profile associated with a second user, wherein both the first and the second profiles comprise at least a picture and a name of their respective users; automatically determine based on wireless communication that the first communication device and the second communication device are coincidently located within a spatial proximity to one another; responsive at least to the first communication device and the second communication device coincidently located within a spatial proximity, transmitting, from the server, a first information about the second profile to the first communication device and a second information about the first profile to the second communication device, wherein the first communication device displays on a first screen a first invitation comprising at least picture and name from the second profile and the second communication device displays on a second screen a second invitation comprising at least picture and name from the first profile, and wherein the first communication device is configured to receive a first input from the first user if the first user is willing to accept the first invitation, and the second communication device is configured to receive a second input from the second user if the second user is willing to accept the second invitation; receiving, at the server, a first response from the first communication device representing the first input; receiving, at the server, a second response from the second communication device representing the second input; responsive to both the first and the second input being positive, storing connectivity information in the database, wherein the connectivity information represents that the first and second users are enabled to communicate using the first and second communication devices; and establishing a connection between the first and second communication devices for enabling the first user and the second user to communicate.

The method may further comprise providing the first and second communication devices with the profile related information beyond the first and second user information comprised in the first and second invitations. The method may further comprise receiving profile related information from a networking device. The method may further comprise receiving profile related information from a networking device in communication with the server. The method may further comprise connecting the server with a contact exchanging application executing on the first and second communication devices to execute services and features available with the server on the first and second communication devices. The method may further comprise discovering, using the contact exchanging application of the first communication device, the second communication device present within the spatial proximity of one another, and presenting a picture and name of the second communication device on user interface of the first communication device before the first user deciding to send an invite to connect. The method may further comprise presenting, by the contact exchanging application, an option to the second user to accept or reject the invitation sent by the first user, sending to the server the acceptance or rejection response of the second user, and allowing the server to communicate the acceptance or rejection response to the first user.

Another embodiment provides a server configured to communicate with a first communication device of a first user and a second communication device of a second user over communication links comprising a cellular network, wherein the server comprises a processor configured to store in a data storage device a first profile associated with the first user and a second profile associated with a second user, both the first and the second profile comprises at least a picture and a name of their respective users, and able to associate each member profile with unique hardware identification associated with the member device; identify a unique ID of a second member in the vicinity and spatial proximity of the first member and provide the first member with the profile of the second member comprising a picture and name to facilitate invitation and connection between both members; send the second member the profile of the first member including picture and name upon first member initiating an invite to the second member to connect over the service; inform the first member if the second member has accepted or rejected the invite to connect initiated by the first member; and once the second member accepts the invite of the first member, store the connectivity between both members in data base and facilitates chat feature between them using respective devices connected to the server.

The server may further comprise a context information retrieval module, which when executed by the one or more processors, provides the first and second communication devices with the profile related information beyond the first and second user information comprised in first and second invitations. The server may communicate with a second server, and wherein the second server is to provide social networking services that operate independently of the server. The server may receive profile related information from the second server. The server may connect with a contact exchanging application executing on the first and second communication devices to execute services and features available with the server. The contact exchanging application may store updated contacts information and profiles of user contacts including pictures. The server may utilize the contact exchanging application of the first communication device to discover the second communication device present within the spatial proximity, and to present a picture and name of the second user associated with the second communication device on user interface of the first communication device before the first user deciding to send an invite to connect. The contact exchanging application may present the second user with an option to accept or reject the invitation sent by the first user by sending to the server the acceptance or rejection response of the second user, and allowing the server to communicate the acceptance or rejection response to the first user.

Another embodiment provides a method for communicating a server with a first communication device of a first user and a second communication device of a second user over communication links comprising a cellular network, the method comprising storing, in a data storage device of the server, a first profile associated with the first user and a second profile associated with the second user, wherein both the first and second profiles comprise at least a picture and a name of their respective users, and able to associate each user profile with a unique hardware identifier associated with the users' devices; identifying a unique hardware identifier of the second communication device within a spatial proximity of the first communication device; based on the identification of the unique identifier, transmitting the second profile of the second user to the first communication device as an invitation to connect with the second communication device; transmitting the first profile of the first user to the second communication device as an invitation to connect with the first communication device; notifying the first communication device when the second user has accepted or rejected the invitation to connect the second communication device with the first communication device; and in response to the acceptance of the invitation by the second user, storing the connectivity information between both the first and second communication devices in the data storage device and facilitates chat feature between the first and second users using the respective communication devices connected to the server.

The method may further comprise providing the first and second communication devices with the profile related information beyond the first and second user information comprised in the first and second invitations. The method may further comprise receiving profile related information from a networking server. The method may further comprise receiving profile related information from a networking server present in communication with the server. The method may further comprise connecting with a contact exchanging application executing on the first and second communication devices to execute services and features available with the server on the first and second communication devices. The method may further comprise discovering, using the contact exchanging application of the first communication device, the second communication device present within the spatial proximity, and presenting picture and name of the second communication device on user interface of the first communication device before the first user deciding to send an invite to connect. The method may further comprise presenting, by the contact exchanging application, an option to the second user to accept or reject the invitation sent by the first user, sending to the server the acceptance or rejection response of the second user, and letting the server communicate the acceptance or rejection response to the first user.

BRIEF DESCRIPTION OF THE DRAWINGS

The embodiments herein will be better understood from the following detailed description with reference to the drawings, in which.

DETAILED DESCRIPTION

Figure 1:
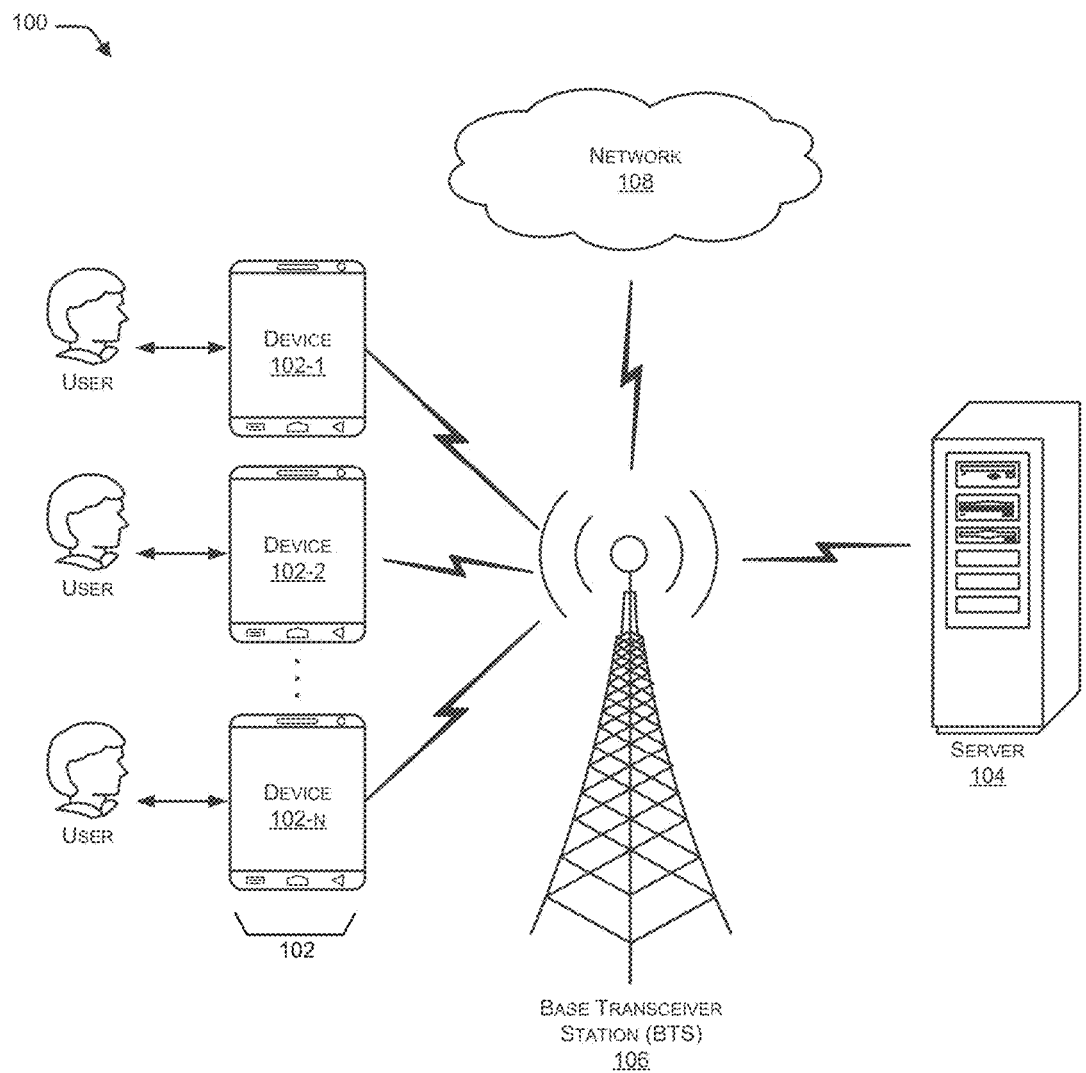
FIG. 1 illustrates an exemplary architecture implementing a server in accordance with the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein. As used herein, the terms "a" or "an" are used, as is common in patent documents, include one or more than one. In this document, the term "or" is used to refer to a "nonexclusive or" unless otherwise indicated.

The embodiments herein provide a system and a method to ascertain authenticity of the data shared over a network service. The embodiments herein provide a system and method that allows disseminating flow of data unit over an un-trusted network. The embodiments herein a system and a method to ascertain authenticity of the data based on the reputation or identity information of the owner of the data in addition to the content of the data shared over a network service. The embodiments herein provide a system and a method to disseminate the flow of data over an un-trusted network. Referring now to the drawings, and more particularly to FIGS. 1 through 10, where similar reference characters denote corresponding features consistently throughout the figures, there are shown exemplary embodiments.

The embodiments herein provide a system and a method to establish a connection between at least two communication devices to share electronic coordinate (EC) files over short-range wireless communication. The embodiments herein provide a system and a method to allow user's communication device to regularly update a local EC file with an updated online EC file. The embodiments herein provide a system and a method to ascertain the presence of communication devices within a range of the short-range wireless communication using a common application executing on the communication devices.

The embodiments herein provide a system and a method for providing a secure and authenticated operation of sharing or exchanging EC files between communication devices. The embodiments herein provide a system and a method of maintaining and storing user's contact files in a database of on an online platform. The embodiments herein provide a system and a method of facilitating a chat feature between users having profiles or accounts over different networking platforms.

The embodiments herein may utilize communication devices, a system (server) and a method implemented in accordance with the descriptions herein. The communication devices generally include a short-range wireless transceiver, such as Bluetooth® or near field communication (NFC) transceiver, targeted towards peer-to-peer wireless communication. The communication devices may further include at least one supplementary wireless communication adapter, which preferably supports longer range and/or higher data rates than the short-range transceiver. Non-limiting examples of the supplementary adapters include a GSM (Global System for Mobile Communications) transceiver and a WLAN (Wireless LAN, wireless local area network) transceiver. The supplementary adapter may be such that it is configured to co-operate with a predetermined communications network (infrastructure) such as the adapters listed above. The communications network may further connect to other networks and provide versatile switching means for establishing circuit switched and/or packet switched connections between the communication devices.

In an aspect, when a first communication device may be brought, by a user thereof, into the spatial proximity; i.e., within the range of the short-range wireless transceiver of remote or second communication device, the communication device may receive notification (including at least picture and name of user of the communication device) from a server herein about profile associated with user of the second communication device. Similar notifications about a profile associated with the user of the first mobile device may be received on the second communication device from the server. In an example, the notification about the profile may include at a picture and a name of respective user. Also, the notification may ask for confirmation (acceptance/rejection) from respective users that whether they want to exchange electronic coordinate (EC) file (also referred to herein as a contact information card) via the short-range wireless communication link. The EC file may include information about the users beyond the information shared along with notification. For example, the EC file may include, but is not limited to, a picture or graphic, phone number, fax number, social network profile identification number, and other encrypted or non-encrypted information. Upon receiving an affirmative response from both the users, a connection may be established by the server between the first and second communication devices of both the users, for exchanging the EC files. In an aspect, the first and second communication devices may exchange the EC files simultaneously or in a serial sequence.

In an aspect, transmission and reception of various data, such as notifications and/or EC files, relative to communication devices and/or system(s)/server(s) connecting the communication devices, may take place directly or via a common client-side application executing on both the communication devices. In an example, in case the transmission and reception of various data takes place using the common client-side application or app, the communication devices may search for another communication devices having same and common client-side application for implementation of the subject matter described in the embodiments herein.

In an aspect, the first communication device may wirelessly send and address notifications to/from remote parties, such as a server arrangement according to the embodiments herein, for storage and further distribution of the exchanged or received EC files from the remote/second communication device, directly to and through the common client-side application installed on the first communication device.

Accordingly, in an embodiment, a server of establishing a communication link for exchanging profile related information between communication devices is provided. In an example, the server may be implemented as, or within, a server for implementing the various functionalities of the embodiments herein. The server may include a non-transitory storage device having embodied therein one or more routines, and one or more processors coupled to the non-transitory storage device and operable to execute the one or more routines. In an aspect, the one or more routines may include a registration module, a detection and notification module, and a communication establishment module. The registration module may communicate with a first communication device of a first user and a second communication device of a second user over communication links including a cellular network. Upon communicating with the first and second communication devices, the registration module may store, in its database, a first profile associated with the first user and a second profile associated with a second user, where both the first and the second profiles may include at least a picture and a name of their respective users. In another example, the first and the second profiles may be stored in a common app (client-side application) executing on the first and second communication devices. In an aspect, when both the first and second communication devices are implementing the common client-side application and are connected through the same server, the first and second communication devices may be considered as users or members of the server connecting them.

Following the storage of the first and second profiles by the registration module, the detection and notification module may continuously track the locations of the first communication device and the second communication device so as to detect whether the first communication device and the second communication device are coincidently located within a spatial proximity. In an example, the range of spatial proximity may be defined based on the range of a standard short-range wireless communications link. In an example, the detection and notification module may locate the communication devices using the common app (client-side application) installed in accordance with the embodiments herein on both the communication devices.

In response to at least the first communication device and the second communication device coincidently located within the spatial proximity, the detection and notification module may transmit a first information about the second profile to the first communication device and a second information about the first profile to the second communication device. Upon transmission or reception of the information about the profiles, the first communication device may display a first invitation including at least the picture and name of the second profile, and the second communication device may display a second invitation including at least the picture and name of the first profile. Also, in an example, the first communication device may be configured to receive a first input from the first user if the first user is willing to accept the first invitation and the second communication device may be configured to receive a second input from the second user if the second user is willing to accept the second invitation.

Upon receipt of the invitations, the connection establishment module may receive a first response from the first communication device representing the first input, and a second response from the second communication device representing the second input. In an example, the common app (client-side application) running on both the first and second communication devices may provide the first and second users with an option to accept or reject the invitation sent by the other respective user. In case both the first and the second inputs are positive towards acceptance of invitation, the connection establishment module may store connectivity information in the database that the first and the second users are now contacts of each other, followed by establishing a communication between the first and second communication devices.

In an aspect, once the communication is established between the first and second communication devices, the first and second users may access or receive user information beyond information received in the first and second invitations. The user information may include, but is not limited to, a picture or graphic, phone number, fax number, social network profile identification number, and other encrypted or non-encrypted information. In an example, the information may collectively referred to as electronic coordinates (EC) of user and accessed/received in the form of a digital file called as EC file.

Based on the information received from the first and second communication devices, the server may communicate with a networking server. The networking server may be operating independently of the server. Further, the networking server may be a server providing social networking services such as Facebook®, Twitter®, Instagram®, MySpace®, LinkedIn®, and the like.

Once the server communicates with the networking server, the server may be able to use contact information, or profile related information, of first or second users to update the user information received from the first or second communication devices.

In an aspect, the server may establish a connection or communication with the contact exchanging applications executing on the first and second communication devices to execute its services and features on the first and second communication devices.

In an aspect, the contact exchanging applications may be used to store updated contacts information and profiles of user contacts including pictures on a respective communication device for facilitating instant access to user.

The embodiments herein further provide a method comprising communicating a server with a first communication device of a first user and a second communication device of a second user over communication links comprising a cellular network; storing, in a database of the server, a first profile associated with the first user and a second profile associated with a second user, where both the first and the second profiles comprise at least a picture and a name of their respective users; responsive at least to the first communication device and the second communication device coincidently located within a spatial proximity, transmitting a first information about the second profile to the first communication device and a second information about the first profile to the second communication device, where the first communication device displays on a first screen a first invitation including at least picture and name from the second profile and the second communication device displays on a second screen a second invitation comprising at least picture and name from the first profile, and the first communication device may be configured to receive a first input from the first user if the first user is willing to accept the first invitation, and the second communication device is configured to receive a second input from the second user if the second user is willing to accept the second invitation; receiving a first response from the first communication device representing the first input; receiving a second response from the second communication device representing the second input; responsive to both the first and the second input being positive, storing connectivity information in the database, wherein the connectivity information represents that the first and second users are enabled to communicate using the first and second communication devices; and establishing a connection between the first and second communication devices for enabling the first user and the second user to communicate.

The embodiments herein further provide a server for communicating with a first communication device of a first user and a second communication device of a second user over communication links including a cellular network. In an aspect, the server may include a non-transitory storage device having embodied therein one or more routines, and one or more processors coupled to the non-transitory storage device and operable to execute the one or more routines. The one or more routines may include a registration module, a detection and notification module, and a connection establishment module. The registration module may store, in a database, a first profile associated with the first user and a second profile associated with the second user. In an example, both the first and second profiles comprise at least a picture and a name of their respective users, and are able to associate each user profile with a unique hardware identifier associated with the users' devices. For example, each user profile may be associated with device's identification number. Once the first and second profiles are stored, the detection and notification module may identify a unique hardware identifier of the second communication device within a spatial proximity of the first communication device. In an example, the range of the spatial proximity of the first communication device may be defined using the range of the short-range wireless communication.

Based on the identification of the unique identifier, the detection and notification module may transmit the second profile of the second user to the first communication device as an invitation to connect with the second communication device, and the first profile of the first user to the second communication device as an invitation to connect with the first communication device. Thereafter, the detection and notification module notifies the first communication device when the second user has accepted or rejected the invitation to connect the second communication device with the first communication device. Following the receipt of the acceptance of the notification, the connection establishment module may store the connectivity information between both the first and second communication devices in the database and facilitate chat feature between the first and second users using the respective communication devices connected to the server.

Based on the information received from the first and second communication devices, the server may communicate with a networking server. The networking server may be operating independently of the server. Further, the networking server may be a server providing social networking services such as Facebook®, Twitter®, Instagram®, MySpace®, LinkedIn®, and the like.

Once the server communicates with the networking server, the server may be able to use contact information, or profile related information, of first or second users to update the user information received from the first or second communication devices.

In an aspect, the server may establish a connection or communication with the contact exchanging applications executing on the first and second communication devices to execute its services and features on the first and second communication devices.

In an aspect, the contact exchanging applications may be used to store updated contacts information and profiles of user contacts including pictures on a respective communication device for facilitating instant access to user.

The embodiments herein further include a method for communicating a server with a first communication device of a first user and a second communication device of a second user over communication links comprising a cellular network. The method may include storing, in a database of the server, a first profile associated with the first user and a second profile associated with the second user, where both the first and second profiles comprise at least a picture and a name of their respective users, and able to associate each user profile with a unique hardware identifier associated with the users' devices; identifying a unique hardware identifier of the second communication device within a spatial proximity of the first communication device; based on the identification of the unique identifier, transmitting the second profile of the second user to the first communication device as an invitation to connect with the second communication device; transmitting the first profile of the first user to the second communication device as an invitation to connect with the first communication device; notifying the first communication device when the second user has accepted or rejected the invitation to connect the second communication device with the first communication device; and in response to the acceptance of the invitation by the second user, storing the connectivity information between both the first and second communication devices in the database and facilitates chat feature between the first and second users using the respective communication devices connected to the server.

In operation, when the first user associated with the first communication device and the second user associated with the second communication device wish to create an account with a server herein, the server communicates with the first and second devices over communication links including cellular network. Once the communication is established, the server may ask the users of the first and second device to install an app; e.g., a client-side application, on their respective devices. Upon installation of the client-side application, the users may log in and create a new user profile by selecting which information he/she wishes to exchange as part of electronic coordinates (EC). Also, the users may select information about the profile which they want to transmit along with an invitation to connect. For example, the information about the user profile may include at least a picture and a name of the user.

Once the user profiles are created, these user profiles are stored on in a web database of the server. While storing the user profiles, the users may also store their contacts or EC files stored on the devices or other networking servers in the web database. For example, the users may synchronize their device contacts, or EC files, with the web database to update the contacts on the web database. In an example, the users may save their user IDs and passwords of other networking servers in encrypted form on the server, so as to allow the server to import contacts or ECs from these other networking servers. In one example, the server may periodically synchronize the information related to user profile and contacts from the communication devices and the other networking servers, for ensuring that the updated information is stored in the web database of the server. As described herein, the web database may also be interchangeably referred to as Electronic Coordinates (EC) master database.

Once the user profiles and the user contacts are stored and updated, the server may continuously monitor the locations of the devices associated/member with the server. In an example, the server may continuously monitor the locations using the app; e.g., a client-side application, installed on the devices. In the example, the app may search for similar or the same app installed on other communication devices present within a spatial proximity. The range of the spatial proximity may correspond to range of a short-range wireless communication standard of the communication devices.

Once the app that is installed on first communication device determines that the second communication device with same app is within a spatial proximity of the first communication device, the server may transmit information about a user profile associated with the first communication device to the second communication device, and also transmits other information about a user profile associated with the second communication device to the first communication device. In one example, the information about the profile may be transmitted and presented as an invitation to connect with the other communication device. In the example, the invitation may present at least a user picture, a user name, and an option to accept/reject the invitation.

Once both the users accept the invitation to connect, the server may store connectivity information in the web database that from now onwards the users of the first and second communication devices are contacts of each other, and then establish a communication between the app implemented on the first and second communication devices to exchange the EC files or contact information. In one example, the app implemented on the first and second communication devices may be a Bluetooth® app or a web app. In an example, in case of a Bluetooth® app, the first and second communication devices may exchange EC files or contact information over a Bluetooth® communication link. In another example, in the case of a web app, the first and second communication devices may exchange or update EC files or contact information over web based services facilitated via cellular services.

Further, once the EC files or the contact information is exchanged between the first and second communication devices, the server may facilitate a universal chat tool. Such a tool may facilitate the users of the first and second communication devices to communicate with each other using messages with their accounts maintained at different networking servers/portals. Thus, with the servers (systems) and methods, users having accounts maintained at disparate networking servers may communicate with each other over the universal chat tool.

Accordingly, the servers (systems) and methods provided by the embodiments herein enable the users to exchange EC files over short-range wireless communication link, allow the users to add the contact information (EC files) from other networking servers/portals to EC master database of the system, allow for the ability to link the online maintained contact information of EC files with a universal chat tool, and allow users to chat across the disparate networking servers/portals.

FIG. 1 illustrates an exemplary architecture 100 for creation, sharing, and exchange of an electronic coordinate (EC) file (e.g., a contact information card) via a short-range wireless communication link in accordance with the embodiments herein. The EC file may include user information having, but is not limited to, a picture or graphic, phone number, fax number, social network profile identification number, and other encrypted or non-encrypted information. Apart from creation, sharing, and exchange of the EC file, the architecture 100 may also facilitate the services including registration with a server, view newly created social card/profile on a server, edit profile including adding multiple pictures, obtain user location dynamically based on standard mobile communication protocols, search for network members in spatial vicinity, access additional features provided by social network such as chat with members, view members who discovered the user, accept or reject invitations to connect, and access any features provided by a social network facilitate by the server.

In an aspect, the architecture 100 may include a plurality of communication devices 102-1, 102-2, . . . , 102-N, hereinafter collectively referred to as communication devices 102 (or simply, devices 102) and individually as communication device 102 (or simply, device 102). Examples of the communication devices 102 may include, but are not limited to, mobile phones, smart phones, personal computers ("PCs"), laptops, and other network-enabled devices which let users to surf the web to access sources of information and entertainment, send e-mails and instant messages.

Further, the communication devices 102 may communicate with each other and a server 104 over a cellular network 108 facilitated by at least one base transceiver station (BTS) 106. In an example, the server 104 may be a networking server, a network server, a web server, or a data server. In an example, the server 104 may facilitate a web-based networking service which allows members or users of that service to interact with their contacts associated or linked to other disparate social networks (e.g., Facebook®, LinkedIn®, Twitter®, etc.), micro-blogs (e.g., Pinterest®, Tumblr®, Instagram®, etc.), blogs, e-commerce sites, and other social networks that support the creation, introduction, sharing, purchase, licensing, renting, and consumption of data.

The cellular network of the BTS 106 may facilitate bi-directional communication links between the communication devices 102 and the server 104 through a communication standard that provides separate facilities for transmission of digital data.

In an aspect, the BTS 106 may establish a communication network 108 between the communication devices 102 and the server 104, and may facilitate communication according to packet-based telecommunications protocol such as 3G, 4G, LTE, or any similar data technology.

In an example, the communication network 108 may be a wireless network, a wired network or a combination thereof.

The communication network may be implemented as one of the different types of networks, such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, communication devices, storage devices, and the like.

When a user of communication device 102-1 wishes to join or become member of the server 104 herein, the user may sign-up or register with a service of the server 104 through website or using the communication device 102-1. In an example, the user may access the service website by browsing a uniform resource locator (URL) address of the website. Once the user lands on the service website of the server 104, the user may register with the server 104 by creating a new account by submitting basic information, including name and picture. For ease of registration, the user may optionally sign-up using other existing social network credentials and import pictures from these other existing social network(s) for creation of the new account with the server 104, if the other existing social network allows transferring and/or access of users' information and personal attributes such as picture(s) and name.

In an aspect, the creation of the user profile may be performed by selectively submitting the profile related information which the user may wish to exchange with other users while establishing communication for the first time. Such selective profile related information may include, but is not limited to, a picture and name of the user. In addition to the selective information, the user information may include, but is not limited to, a picture or graphic, phone number, age, e-communication address, fax number, social network profile identification number, device's identification number, and other encrypted or non-encrypted information.

Figure 2A:
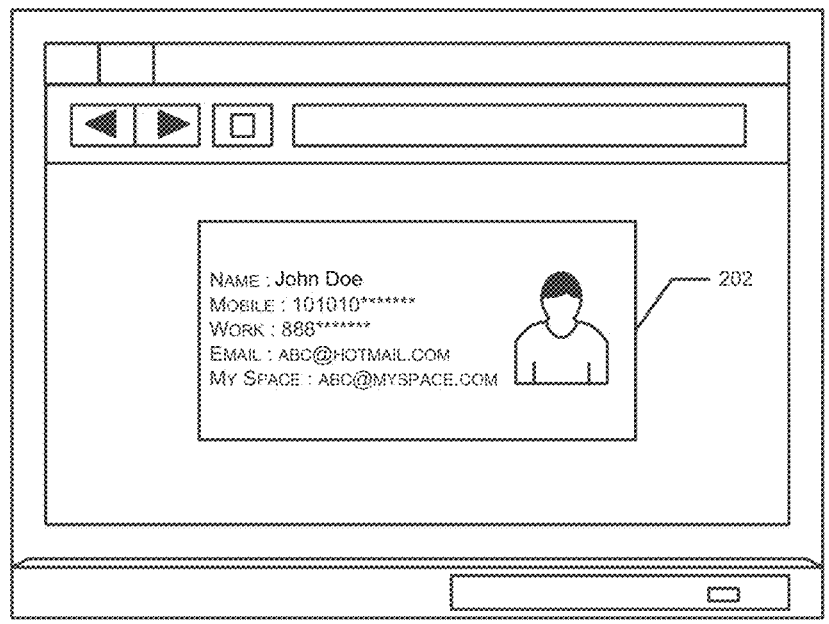
FIG. 2A illustrates a sample EC file in accordance with the embodiments herein.

Additional aspects of the registration process may include creating a social electronic coordinates (EC) card or profile, which is intended to be shared with other members or be discovered by other members of the server 104. An example of an EC card 202 generated is shown in FIG. 2A, with reference to FIG. 1. In an aspect, the user's or a member's profiles may be available for members present in a spatial proximity to the user's communication device 102-1 to view, via a mobile data connection to internet or direct internet connection from the communication device 102-1 to a local wireless network.

In an embodiment, signing-up or registration through the communication device 102-1 may require the user of that communication device 102-1 to download a CSA (Client-side Application) from either a third-party application provider or request from the service website to send to his/her communication device 102-1 a link allowing the download of the CSA. Once the CSA is downloaded on the communication device 102-1, the user may provide information by filling out, including uploading graphics or pictures, an on-line profile through a web based interface or interface of the CSA.

Further, the CSA residing on the communication device 102-1 may facilitate the user to communicate directly with the service website of the server 104, through a provided internet connection, to synchronize/update contacts and to manage communication with contacts or potential new contacts, access account information via username/password, or phone ID, send search requests for information about users in the spatial proximity, transmit invitations for accepting/denying exchange requests for exchange of contact information, obtain instances of the server addresses, allow the user to edit his/her own profile, and update photos or information or add additional photos or information, etc. In an example, the CSA may connect to the server 104 through internet connection provided by the communication device 102-1. In an example, the CSA may obtain a mobile device unique identifier upon completion of the sign-up process from the communication device 102-1 or upon first access from the communication device 102-1. The obtained unique identifier may then be submitted to the server 104 for associating with user account of the user associated with the communication device 102-1, so that the unique identifier may be used to authenticate the communication device 102 for providing access to the user.

Further, personal and other user information, including hobbies, business associations, or personal information as examples, may also be added by way of the CSA for storage on the server 104. In order to take advantage of the functionalities offered by the server 104, the member of the server's service may have a communication device that provides separate facilities for transmitting digital data. This allows the communication device to act like any other computer over the Internet, including sending and receiving data via the Internet Protocol.

Figure 2B:
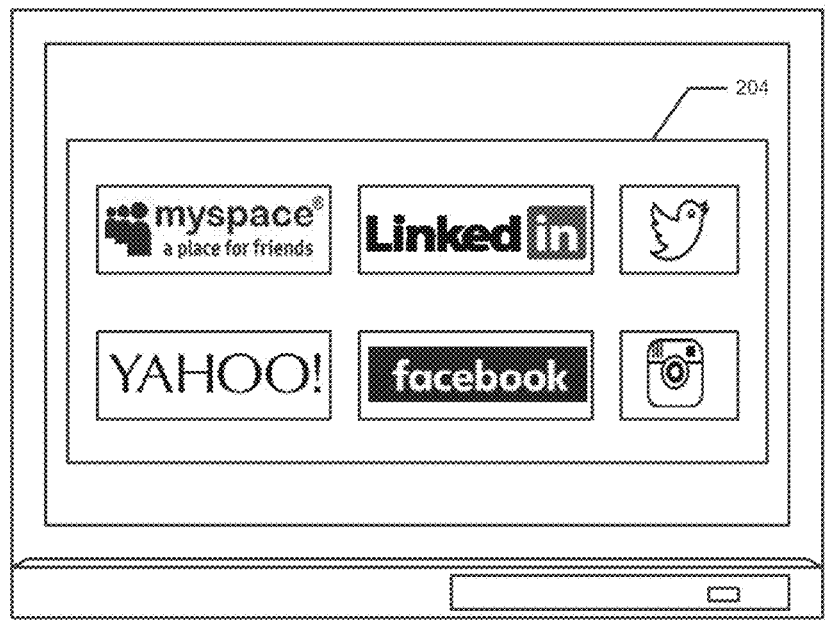
FIG. 2B illustrates a window-in-window viewer in accordance with the embodiments herein.

In a further aspect, the service offered by the server 104 may be part of a social network. Accordingly, following the creation or registration of the new account with the server 104, the server 104 or the CSA may prompt the user to enter the login credentials for other social networks in case the user wishes to link his/her other social networks with the service offered by the server 104 herein. The user may then provide his/her login credentials for other social networks, which in turn allows the user to view multiple social networks of his/her choice into a window-in-window viewer 204 (as shown in FIG. 2B, with reference to FIGS. 1 and 2A) of the service. With the window-in-window viewer 204, the user may access anyone or all the social networks at a single service of the server 104 herein.

In an aspect, from the other social networks linked onto the service of the server 104, the server 104 may import contacts into an EC master database maintained for the user of the communication device 102-1. Such imported contacts may be synchronized regularly or periodically with the updated profile related information from the linked other social networks, so as to maintain an up-to-date EC master database of EC files or cards.

Figure 2C:
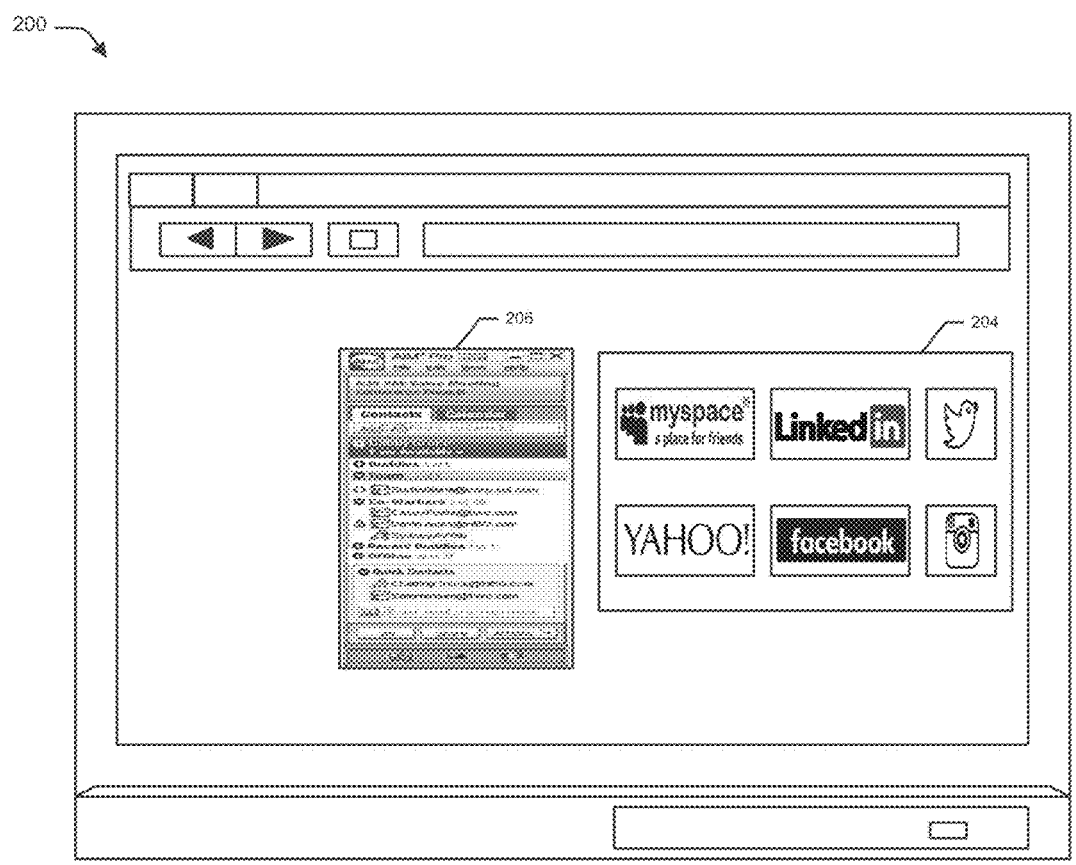
FIG. 2C illustrates an exemplary representation of a web-based portal of the server in accordance with the embodiments herein.

FIG. 2C, with reference to FIGS. 1 through 2B, illustrates an example of a service website 200 associated with the server 104. The service website 200 may provide a user with a network-based storage for personal contact information, creation of a custom social EC cards to send to discovered, or discovering, users who are also members of the service, for the purpose of providing personal contact information including personal attributes such as picture(s) to other users/member and for accessing personal contact information including personal attributes such as picture(s) of other users/members of the service. Further, as may be seen from FIG. 2C, the service website 200 may include a universal chat tool 206. The universal chat tool 206 may have the ability to login with multiple user IDs over various other social networks chat. For instance, a user may chat with users or contacts using Google®, AIM®, Yahoo!® services and other chat applications. In one example, the universal chat in accordance with the embodiments herein may be performed between the members of the service offered or managed by the server 104 herein.

Figure 3:
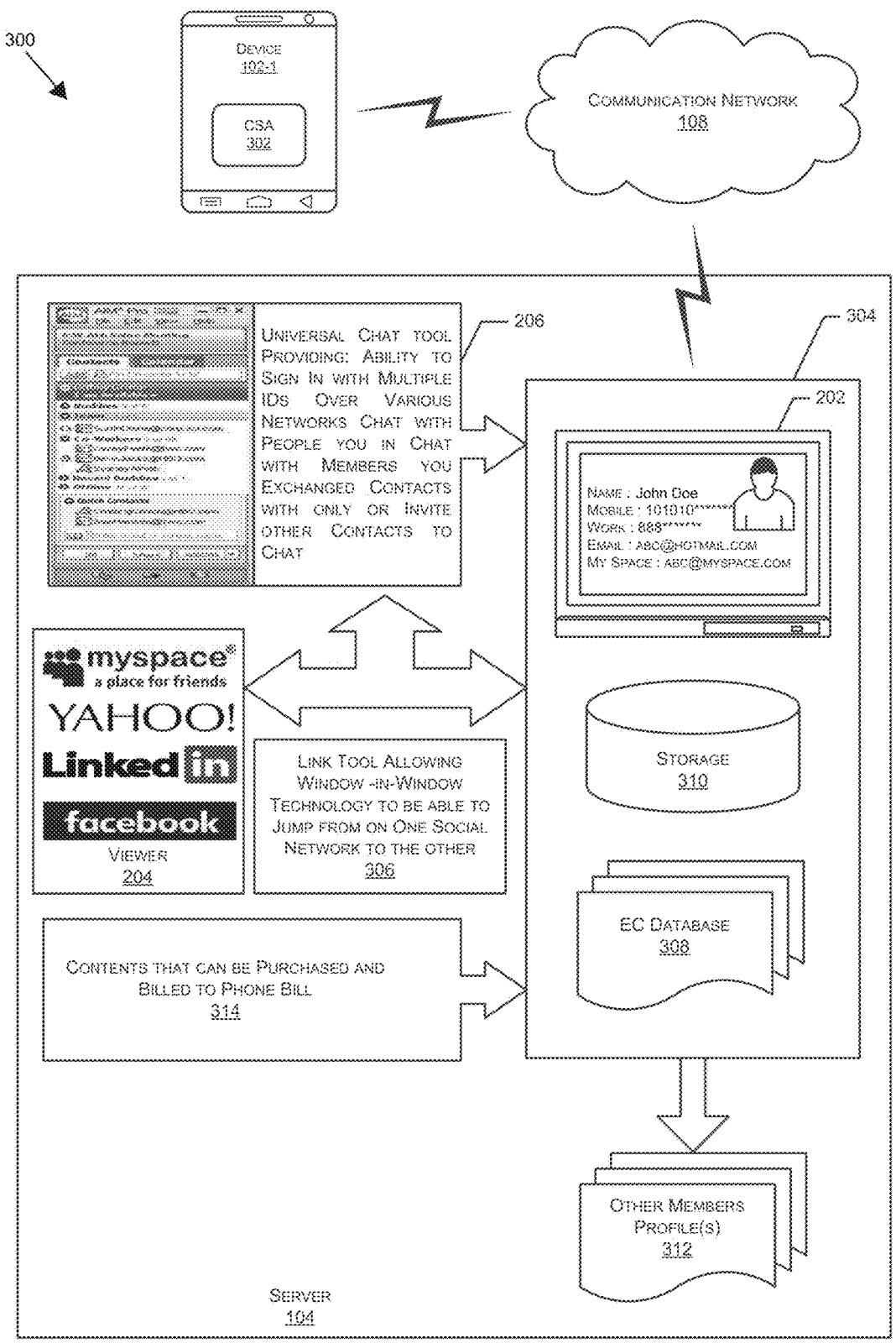
FIG. 3 illustrates an exemplary architecture implementing the server in accordance with the embodiments herein.

FIG. 3, with reference to FIGS. 1 through 2C, illustrates an architecture 300 implementing the server 104 in accordance with an exemplary embodiment. As shown in FIG. 3, the architecture 300 may include the communication device 102-1 communicating with the server 104 over the communication network 108.

As described above, the communication device 102-1 may include a CSA 302. The CSA 302 may reside on any communication device, and is not limited to smartphone applications, which means that the CSA 302 would be able to provide support to multiple operating systems. The CSA 302 may be configured to collect characteristics, such as the device identification number, from the communication device 102-1 for the purpose of associating the communication device 102-1 with a user account 304 maintained at the server 104. This association between the unique identifier, such as the device identification number, and the user account 304 may be used to report the location of the communication device 102-1 to the server 104 dynamically and authenticate the user with communication device 102-1 used.

In order to completely utilize the communication device's features provided by the service including dynamic search of members in spatial proximity, the user may have to install the CSA 302 to the communication device 102-1. The CSA 302 associated with the server 104 may enable the user to update, replace, and revise the social profile or personal attribute information, modify, hide or publish profile information (at the server) as contained in the user's contact information; e.g., the information contained in the user's profile which may be transmitted when the user initiates discovery process. Furthermore, the CSA 302 may allow the user to indicate interest in connecting with a member, or the user is discovered by other members searches and communicate to other members though features such as SMS, chat, text, and other features.

In accordance with the embodiments herein, the server 104 may associate each communication device 102 with a member account 304 of the service using a unique identifier such as an identification number. The device identification number may be used for future location reporting and authentication for secure and future log in, if needed.

In an aspect, the member account 304 may store or maintain the profile information related to user's EC card 306. In addition to the user's or member's EC card 306, the member account 304 may include an EC master database 308 for storing or maintaining the EC cards/files of the users/members which at in contact with the user. Further, the member account 304 may include storage 310 for storing data temporarily during processing or execution of various tools and/or applications of the service offered by the server 104.

In addition to the member account 304, the server 104 may include other member accounts 312 as shown in FIG. 3. Further, the server 104 may include contents 314 that may be purchased and billed to the user of the communication devices 102 associated with the service of the server 104.

Further, in an aspect, the member account 304 may be associated with a link tool 306 allowing the server 104 to link and navigate the window-in-window viewer 204 from one social network window to another social network window, and may be associated with the universal chat tool 206 allowing the user to chat with other members/users having messenger accounts of different social networks.

With such an architecture 300 in place, the user of the communication device 102-1 may communicate with the server 104 to create his/her membership/user account 304 and then maintain the EC master database 308 for utilizing various services of the server 104.

Once the user of the communication device 102-1 has created his/her membership account and associated profile on the service website of the server 104, the user may connect with the server 104 using CSA 302 to enquire about other members in the spatial proximity of the communication device 102-1. In an example, the range of the spatial proximity may correspond to the range of standard short-range wireless communication. The server 104, after receiving an inquiry on members in the spatial proximity, may transmit an invitation to connect with list of members, including name and picture of the members, to the requesting communication device 102-1, which is then displayed on screen of the communication device 102-1. Thus, the server 104, not only provides a list of members, but also provides names and pictures of the members for easy identification. Once the requesting user receives the list of pictures and names, the user may select from the communication device 102-1 for exchange of EC cards or contact information. Once the user selects any one or more member(s) from the received list of members, the server 104 may transmit an invitation to connect the requesting user/member with the selected member(s). At this point, when the server 104 receives an acceptance for exchange of EC cards from the selected member and the requesting member, the server 104 may establish a communication between the requesting user and the selected member to exchange the EC cards or contact information. The detailed working and operation of the server is further explained with reference to FIG. 4.

Figure 4:
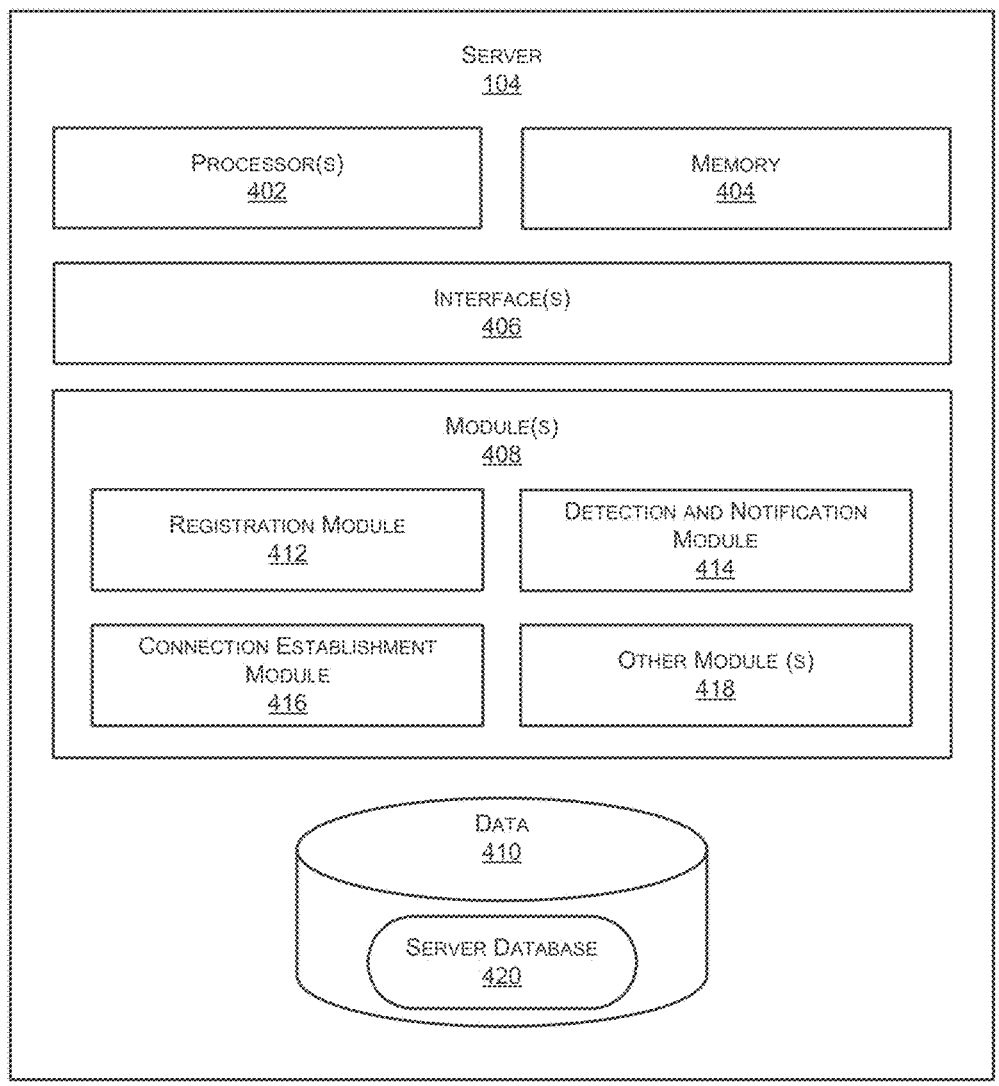
FIG. 4 illustrates various components of a server in accordance with the embodiments herein.

FIG. 4, with reference to FIGS. 1 through 3, illustrates various components of a server 104. In an example, the server 104 may be implemented to facilitate service accessible through a website or a client-side application. The server 104 may be in communication with one or more communication devices 102 through the communication network 108 as discussed above. In an example implementation, the communication devices 102 may be configured as mobile phones, smart phones, laptops, notepads, or any other network-enabled devices. In an example, the communication devices 102 may include a client-side application (CSA) 302 to access the service of the server 104. As an example, the CSA 320 may be a web application or Bluetooth® application.

In an aspect, the server 104 may include one or more processor(s) 402. The one or more processor(s) 402 may be implemented as one or more microprocessors, microcomputers, microcontrollers, digital signal processors, central processing units, logic circuitries, and/or any devices that manipulate data based on operational instructions. Among other capabilities, the one or more processor(s) 402 are configured to fetch and execute computer-readable instructions stored in a memory 404 of the server 104. The memory 404 may store one or more computer-readable instructions or routines, which may be fetched and executed to create or share the data units over a network service. The memory 404 may include any non-transitory data storage device including, for example, volatile memory such as RAM, or non-volatile memory such as EPROM, flash memory, and the like.

The server 104 may also include an interface(s) 406. The interface(s) 406 may include a variety of interfaces, for example, interfaces for data input and output devices, referred to as I/O devices, storage devices, and the like. The interface(s) 406 may facilitate communication of the server 104 with various communication devices 102 coupled to the server 104. The interface(s) 406 may also provide a communication pathway for one or more components of the server 104. Examples of such components include, but are not limited to, module(s) 408 and data 410.

The module(s) 408 may be implemented as a combination of hardware and programming (for example, programmable instructions) to implement one or more functionalities of the module(s) 408. In examples described herein, such combinations of hardware and programming may be implemented in several different ways. For example, the programming for the module(s) 408 may be processor executable instructions stored on a non-transitory machine-readable storage medium and the hardware for the module(s) 408 may include a processing resource (for example, one or more processors), to execute such instructions. In some examples, the machine-readable storage medium may store instructions that, when executed by the processing resource, implement the module(s) 408. In such examples, the server 104 may include the machine-readable storage medium storing the instructions and the processing resource to execute the instructions, or the machine-readable storage medium may be separate but accessible to server 104 and the processing resource. In other examples, the module(s) 408 may be implemented by electronic circuitry. In an example, the module(s) 408 may include a registration module 412, a detection and notification module 414, a connection establishment module 416, and other module(s) 418. The other module(s) 418 may implement functionalities that supplement applications or functions performed by the server 104 or the module(s) 408.

The data 410 may include data that is either stored or generated as a result of functionalities implemented by any of the components of the module(s) 408. In one example, the data 410 may include a server database 420 to store any contact information exchanged and synchronized with the communication devices 102.

In operation, when s first user associated with a first communication device 102-1 and a second user associated with a second communication device 102-2 wish to create an account with a service offered by the server 104 herein, the users of these devices 102-1, 102-2 may install a client-side application (CSA) 302 on their respective devices 102-1, 102-2 to establish a communication with the server 104. In an alternate example, the users may directly access the service website of the server 104 to create an account. Once the user accesses the server 104 via CSA or service website, the users may create their respective accounts by creating respective first and second profiles using the registration module 412. Each of the first and second profiles may include a picture and name of a respective user.

Once the user profiles are created, the registration module 412 may store these user profiles in the web database of the server 104. While storing the user profiles, the registration module 412 may prompt the users to store their contacts already stored on their respective devices or other networking servers, in the web database. For example, the registration module 412 may ask the users to allow synchronization of their device contacts with the web database to update the contacts on the web database. In an alternative example, the registration module 412 may prompt the users to save their user IDs and passwords of other networking servers in the encrypted form on the server 104, so as to allow the server 104 to import contacts from these other networking servers.

In one example, the registration module 104 may periodically synchronize the information related to the user profile and contacts from the communication device and the other networking servers, to ensure that the updated information is stored in the web database, or Electronic Coordinates (EC) master database, of the server 104.

Once the user profiles and the user contacts are stored and updated, the detection and notification module 414 may continuously monitor the locations of the devices associated/member with the service of the server 104. In an example, the detection and notification module 414 may trigger the monitoring upon receiving a request from a user of one of the first and second communication devices. Further, the detection and notification module 414 may continuously monitor the locations of the first and second devices using dynamic locations obtained from GPS, etc.

Once the detection and notification module 414 locates the second communication device in the spatial proximity of the first communication device, the detection and notification module 414 may transmit information about a user profile associated with the first communication device 102-1 to the second communication device 102-2, and also transmits another information about a user profile associated with the second communication device 102-2 to the first communication device 102-2. In one example, the information about the first and second profiles may be transmitted and presented as an invitation to connect with other communication device. In an example, the invitation may present at least a user picture, a user name, and an option to accept/reject the invitation.

Once both the users accept the invitation to connect through the detection and notification module 414, the connection establishment module 416 may store a connectivity information in the web database that from now onwards the users of the first and second communication devices 102-1, 102-2 are contacts of each other, and then establish a communication between the CSA 302 implemented on the first and second communication devices 102-1, 102-2 to exchange the EC files or contact information. In one example, the CSA 302 implemented on the first and second communication devices 102-1, 102-2 may be either a Bluetooth® app or a web app. In an example, in the case of a Bluetooth® app, the first and second communication devices 102-1, 102-2 may exchange EC files or contact information over a Bluetooth® communication link. In another example, in the case of a web app, the first and second communication devices 102-1, 102-2 may exchange or update EC files or contact information over service website facilitated via cellular services by the server 104.

Further, once the EC files or the contact information are exchanged between the first and second communication devices 102-1, 102-2, the server 104 may facilitate the universal chat tool 206. The tool 206 may facilitate the users of the first and second communication devices 102-1, 102-2 to communicate with each other using message tools with their accounts maintained at different networking servers. Thus, with the servers (systems) and methods, users having accounts maintained at disparate networking servers may communicate with each other.

Accordingly, the servers (systems) and methods as provided by the embodiments herein enable the users to exchange EC files over a short-range wireless communication link, allow the users to add the contact information from other networking servers/portals to EC master database of the system, allow the ability to link the online maintained contact information of EC files with a universal chat tool, and allow users to chat across the disparate networking servers/portals.

The operation of the server 104 is further described in connection with FIGS. 5 through 8, with reference to FIGS. 1 through 4. In an exemplary implementation, upon creating a user account with the service of the server 104, a text message may be sent on the number associated with the communication device 102. The text message may include a link that once clicked will result into installation of client-side application (CSA) 302 on the communication device 102. In some examples, the CSA 302 implemented on the first and second communication devices 102-1, 102-2 may be either a Bluetooth® app, an NFC app, or a web app.

Upon installation of the CSA 302, the user may utilize the CSA 302 to update the online profile with the new contacts in various ways. In an example, the communication devices 102-1, 102-2 may include application interface management software (AIMS) 502, 504 which facilitates the storage of newly exchanged or acquired EC files in a temporary or permanent storage library 506, 508.

Figure 5:
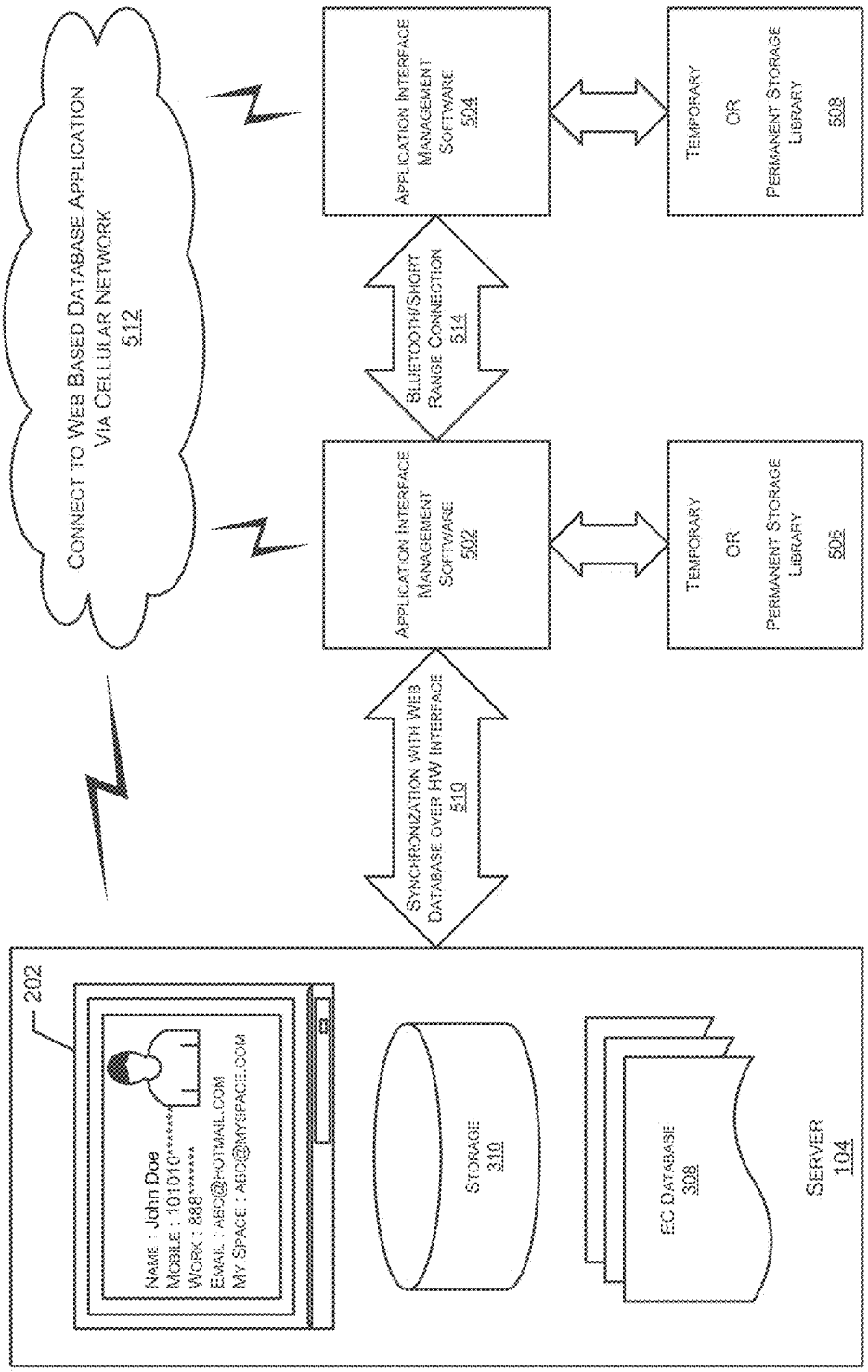
FIG. 5 illustrates an exemplary architecture implementing the server in accordance with the embodiments herein.
Figure 6:
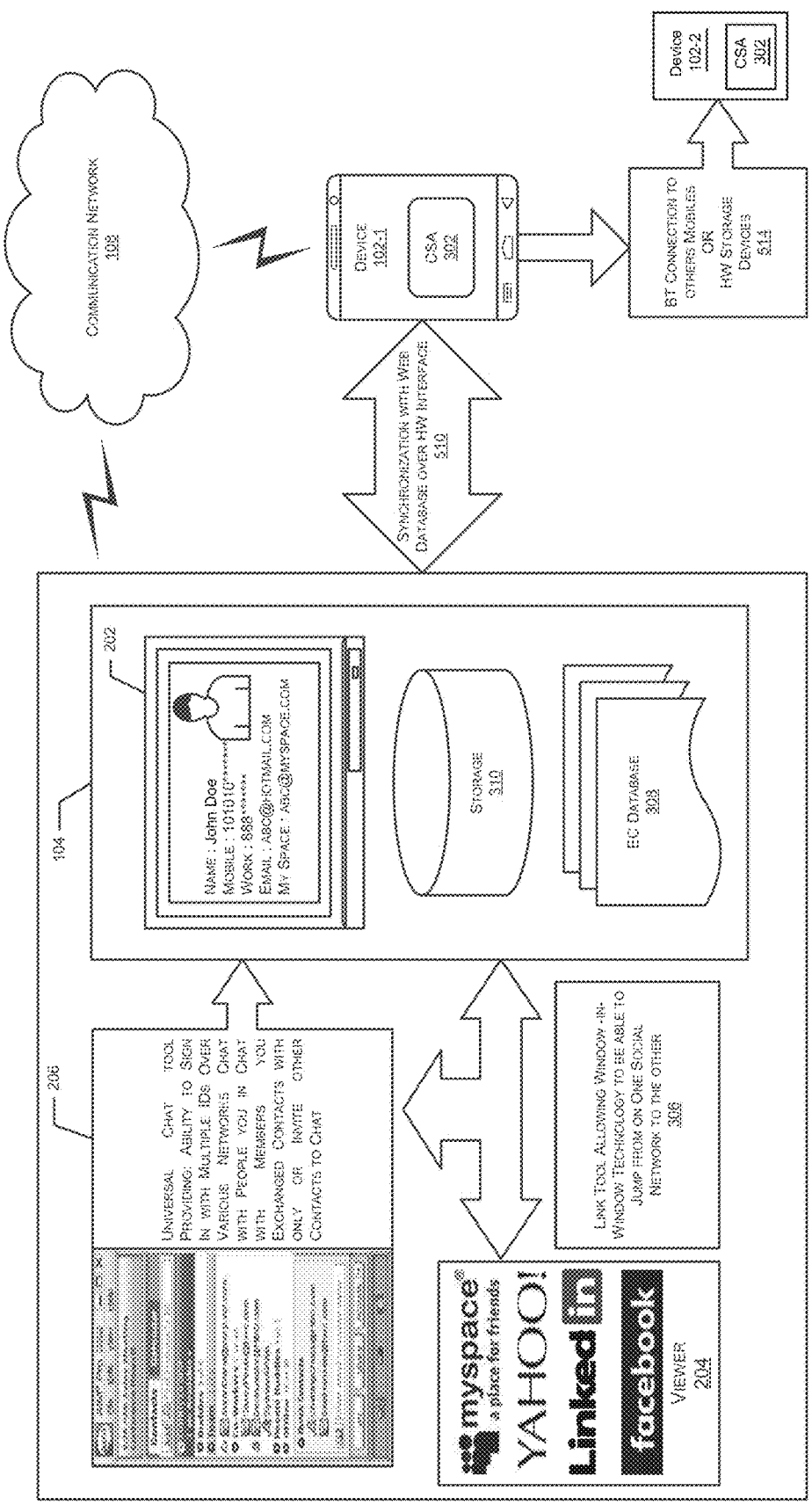
FIG. 6 illustrates another exemplary architecture implementing the server in accordance with the embodiments herein.

Further, once the newly exchanged or acquired EC files are stored in the temporary or permanent storage library 506, 508, the CSA 302 may update the online profile using cellular signals, or hardware connection that allows the communication device to be plugged into a computer. For example, as shown in FIGS. 5 and 6, the first communication device 102-1 may include the AIMS 502, which may decide based on the available network conditions that whether the communication device 102-1 may be connected through web database hardware interface 510 or cellular network 512 for synchronizing or updating the web database with the newly exchanged or acquired EC files.

In an example, after complete update or synchronization of the user profile, the user may download and store his/her contacts on the communication device 102-1 in case the communication device 102-1 has required storage capacity in the temporary or permanent storage library 506, 508.

Once the contacts at the communication device 102-1 and the web database are synchronized, the user of the communication device 102-1 may request the server 104 to detect or locate another communication device in spatial proximity of the communication device 102-1. Upon receipt of the request, the server 104 may perform a detection to search another communication device in the spatial proximity of the requesting communication device 102-1 using the Bluetooth® or Short range connection 514 of the requesting communication device 102-1 and presents the user profile (picture and name of user) associated with the detected communication device 102-2 to the requesting communication device 102-1. If the user of the requesting communication device 102-1 accepts the request to connect with the detected communication device 102-2, the user of the requesting communication device 102-1 may indicate this and the process of informing/notifying the other member associated with the detected communication device 102-2 is managed by the server 104 over cellular network 512. Thus, no direct contact occurs between users (of different communication devices) at this point and will not unless both the users elect to exchange personal information such as device numbers to connect outside of provided service and features. This managed communication by the server 104 may ensure privacy and allows users to reject connections or terminate conversations without having to worry about direct connections potential issues.

Figure 7:
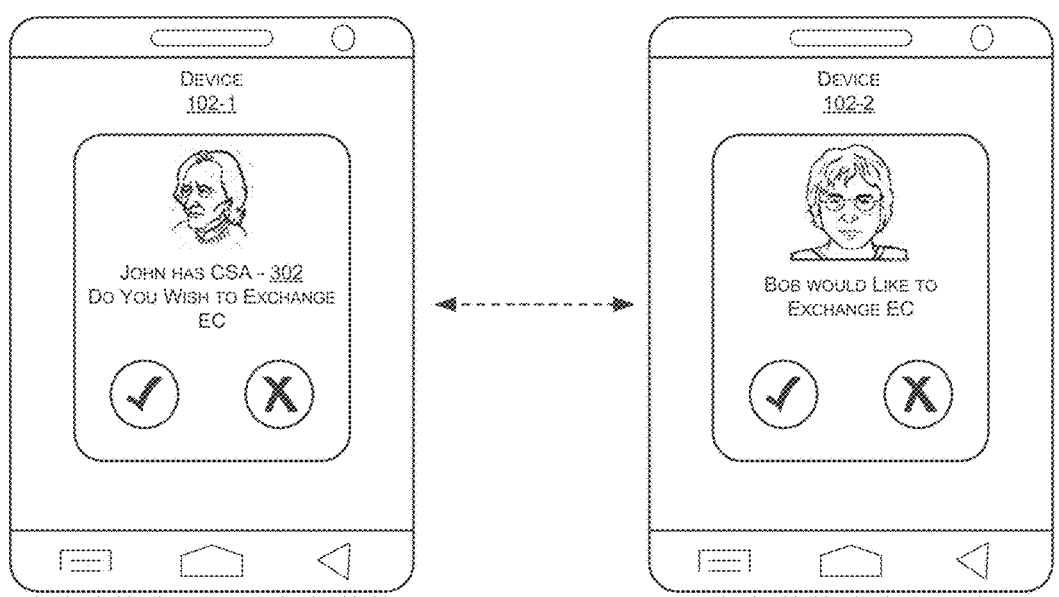
FIG. 7 illustrates an example of the notification of an invitation to connect, in accordance with the embodiments herein.

FIG. 7, with reference to FIGS. 1 through 6, illustrates a further example of notification to the detected users alerting them to exchange request. The notification or invitation may include the users' profile including the users' name and picture, along with an option to accept or reject. For instance, referring to FIG. 7, when a user BOB of a requesting device 102-1 transmits an invitation to connect with a user JOHN (whose device 102-2 is found to be in spatial proximity of the BOB's device 102-1), BOB's device 102-1 may present a message that "JOHN's device 102-2 has CSA 302 and therefore would you wish to exchange EC?". Similarly, John's device 102-2 may present a message that "BOB would like to exchange EC". The invitation to connect includes at least a picture and name of the users, and does not include the contact details such as the device numbers or addresses of the users. Once the users (BOB and John) provide a positive feedback in response to the message displayed on their devices, their devices 102-1 and 102-2 may establish a short-range wireless connection to exchange contact details or EC.

Figure 8:
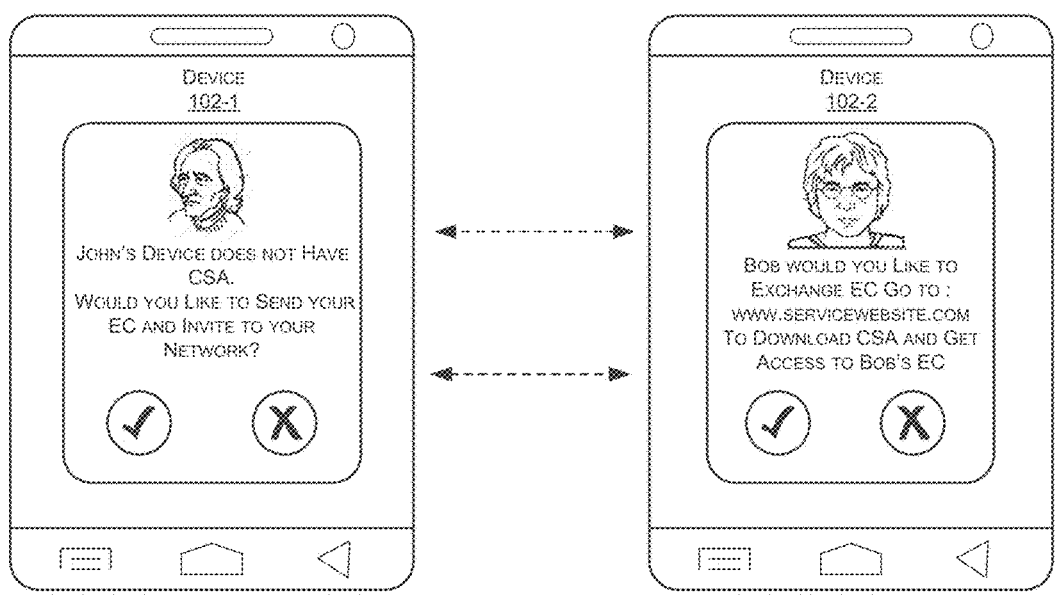
FIG. 8 illustrates another example of the notification of an invitation to connect, in accordance with the embodiments herein.

FIG. 8, with reference to FIGS. 1 through 7, shows an alternative example of a notification when the detected device 102-2 of JOHN does not have a CSA installed thereon. In such a scenario, the server 104 may transmit a SMS (short message service) message with a link that once clicked/accepted by JOHN may divert the JOHN to service website of the server, to accept or reject the invitation. Also, acceptance of the invitation may facilitate the download of the CSA 302 on JOHN's device 102-2 to exchange contact information or EC with device 102-1 of BOB. Also, in the scenario represented in FIG. 8, the requesting device 102-1 of BOB may be provided with a notification that the detected device 102-2 of JOHN does not have the required CSA 302 and therefore would BOB like to share his EC cards without receiving acceptance from the detected device 102-2, and invite JOHN to join his network over service website facilitated by the server 104.

In the examples shown in FIGS. 7 and 8, the user (JOHN) of the detected device 102-2 may have the option of accepting the invitation, ignoring/declining or engage in services provided by the server 104, so as to chat or SMS with or without accepting connection with the user of the requesting device 102-1. Since all of the communications between members/users is managed by the server 104, the server database 420 may store any contact information exchanged and add it through a synchronization method with the CSA 302 as well as keep the history of any conversations/SMS between the members/users.

Further, the CSA 302 may include features such as storing edits to profiles or communication between the members/users and synchronizes to the server database 420 for storage once connection between the CSA 302 and server 104 is established. This dual storage feature allows the user to restore communication between users on a new device if the device in use is lost or damaged as well as restoring all account information.

In the case where a user switches or loses a device, all the user has to do is to install the CSA 302 on the new device and login with his/her credentials. Once an internet connection is established between the new device, the CSA 302 and server 104, and user credentials are verified; the server 104 synchronizes all stored information to the new device, and the new installed CSA 302 reports the new device unique hardware identification number for further services.

Further, the server 104 facilitates communication between the two users' devices 102-1, 102-2 and may provide additional features such as the ability to chat via SMS or email service and other services with reference to FIGS. 1 through 8.

Figure 9:
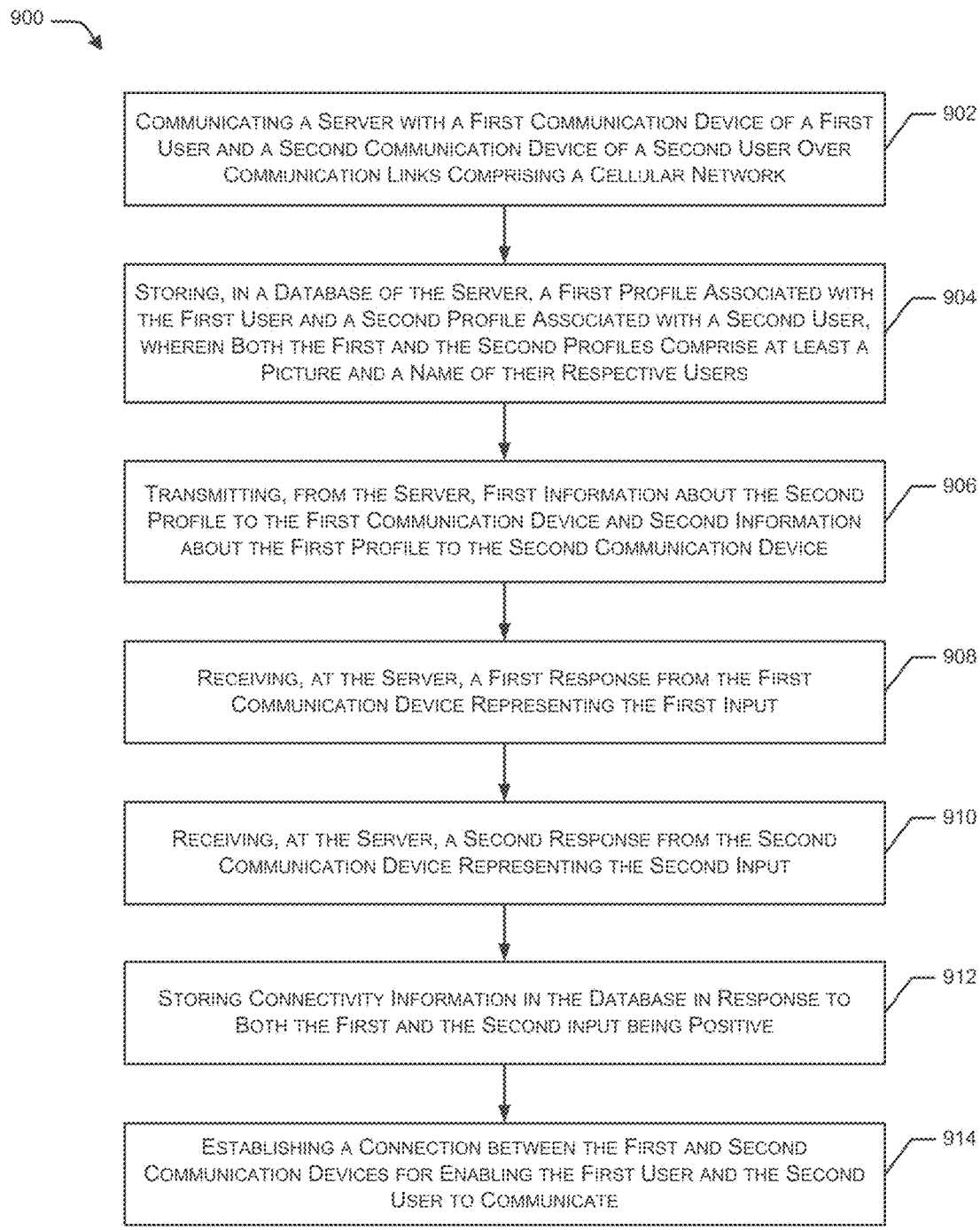
FIG. 9 an exemplary flow diagram illustrating a first method, in accordance with the embodiments herein.
Figure 10:
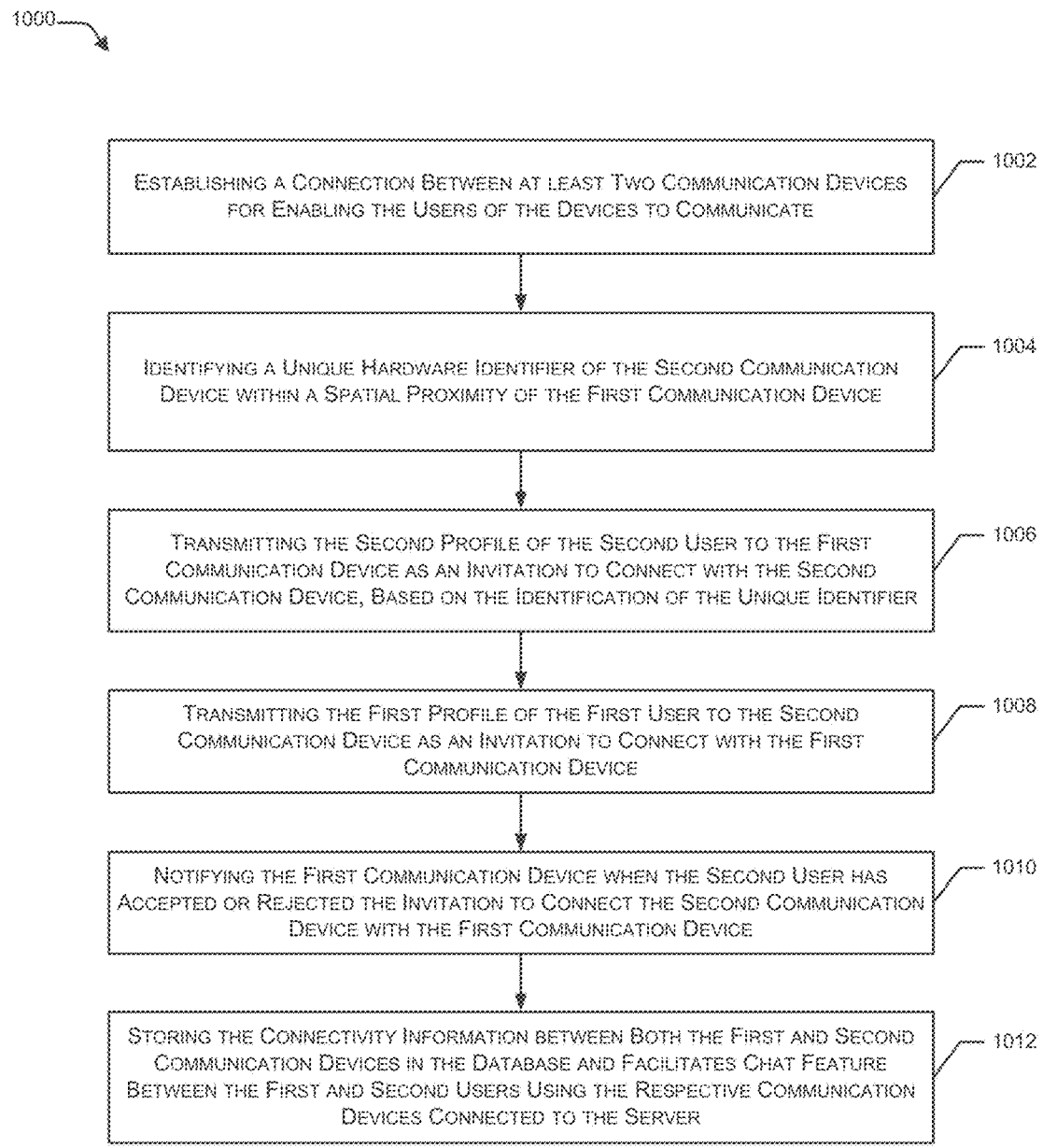
FIG. 10 illustrates an exemplary flow diagram illustrating a second method, in accordance with the embodiments herein.

FIGS. 9 and 10, with reference to FIGS. 1 through 8, illustrate example methods 900 and 1000, respectively, for establishing a connection between at least two communication devices 102-1, 102-2 for enabling the users of the devices 102-1, 102-2 to communicate with one another. The order in which the methods are described is not intended to be construed as a limitation, and any number of the described method blocks may be combined in any order to implement the methods, or an alternative method. Furthermore, methods 900 and 1000 may be implemented by processing resource or communication device(s) through any suitable hardware, non-transitory machine-readable instructions, or combinations thereof.

It may also be understood that methods 900 and 1000 may be performed by programmed communication devices, such as communication device(s) 102 or server 104. Furthermore, the methods 900 and 1000 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 900 and 1000 are described below with reference to communication device(s) 102 as described above; other suitable systems for the execution of these methods may also be utilized. Additionally, implementation of these methods 900, 1000 is not limited to such examples.

In FIG. 9, with reference to FIGS. 1 through 8, at block 902, the method 900 may include communicating a server 104 with a first communication device 102-1 of a first user and a second communication device 102-2 of a second user over communication links comprising a cellular network 108. At block 904, the method 900 may include storing, in a database 420 of the server 104, a first profile associated with the first user and a second profile associated with a second user, wherein both the first and the second profiles comprise at least a picture and a name of their respective users.

At block 906, responsive at least to the first communication device 102-1 and the second communication device 102-2 coincidently located within a spatial proximity of one another, the method 900 may include transmitting, from the server 104, first information about the second profile to the first communication device 102-1 and second information about the first profile to the second communication device 102-2. In an example, the first communication device 102-1 may display a first invitation comprising at least a picture and name from the second profile, and the second communication device 102-2 may display a second invitation comprising at least a picture and name from the first profile. Further, the first communication device 102-1 may be configured to receive a first input from the first user if the first user is willing to accept the first invitation, and the second communication device 102-2 may be configured to receive a second input from the second user if the second user is willing to accept the second invitation.

At block 908, the method 900 may include receiving, at the server 104, a first response from the first communication device 102-1 representing the first input. At block 910, the method 900 may include receiving, at the server 104, a second response from the second communication device 102-2 representing the second input. At block 912, the method 900 may include storing connectivity information in the database 420 in response to both the first and the second input being positive. In an example, the connectivity information may represent that the first and second users are enabled to communicate using the first and second communication devices 102-1, 102-2. At block 914, the method 900 may include establishing a connection between the first and second communication devices 102-1, 102-2 for enabling the first user and the second user to communicate with one another.

FIG. 10, with reference to FIGS. 1 through 9, provides another example method 1000 for establishing a connection between at least two communication devices 102-1, 102-2 for enabling the users of the devices 102-1, 102-2 to communicate with one another. At block 1002, the method 1000 may include storing, in a database 420 of the server 104, a first profile associated with the first user and a second profile associated with the second user. In an example, both the first and second profiles comprise at least a picture and a name of their respective users, and are able to associate each user profile with a unique hardware identifier associated with the users' devices 102-1, 102-2.

At block 1004, the method 1000 may include identifying a unique hardware identifier of the second communication device 102-2 within a spatial proximity of the first communication device 102-1. At block 1006, the method 1000 may include transmitting the second profile of the second user to the first communication device 102-1 as an invitation to connect with the second communication device 102-2, based on the identification of the unique identifier. At block 1008, the method 1000 may include transmitting the first profile of the first user to the second communication device 102-2 as an invitation to connect with the first communication device 102-1.

At block 1010, the method 1000 may include notifying the first communication device 102-1 when the second user has accepted or rejected the invitation to connect the second communication device 102-2 with the first communication device 102-1. At block 1012, the method 1000 may include, in response to the acceptance of the invitation by the second user, storing the connectivity information between both the first and second communication devices 102-1, 102-2 in the database 420 and facilitates a chat feature between the first and second users using the respective communication devices 102-1, 102-2 connected to the server 104.

Thus, the embodiments herein allow for the locating of devices 102 and the ability to communicate amongst the devices 102 by associating personal attributes to each device 102 such that when a search is performed, a face picture is found rather than a hardware ID number (e.g., device identification number). Associating personal attributes such as pictures and personal attributes allow users to identify other members and select members whom they wish to exchange contacts with or connect with through the social network.

Further, the systems and methods described herein may be used for meeting people including discovering people; e.g., viewing their pictures, names, or other personal information, and selecting one or more people to send an invitation to. The invitation may take the form of a social card, EC card, or other manner of engaging another person in a social atmosphere like quick SMS or flag that there is interest of connecting, or even a business setting such as a meeting, trade show, conference, and the like.

The embodiments herein provide a server 104 that cross-references a location of a first user's device 102-1 with registered members in a spatial proximity of the first user's device 102-1 and returns the results by disclosing personal user attributes including pictures and names of all members in the spatial proximity of the first user's device 102-1. The first user who initiated the inquiry may select from the results returned any discovered user he/she wishes to connect with and send a form of invitation to connect using network available tools such as email, SMS, text or any customized invitation form. The invitation to connect to the inquiring user would include his/her personal attributes including picture and name. The discovered member who received invitation may accept, ignore or decline connecting with the inquiring user. At the same point of time, the first user may also receive an invitation from the server 104 to accept, ignore or decline connecting with the discovered member. Upon receipt of a positive acceptance response from both users, the server 104 establishes a connection to exchange the user EC cards.

The communication between requesting and discovered users may then proceed through services provided by the social network server 104, thereby bypassing the limitations of communication over one protocol, network limitation/fees, or incompatibility for different types of devices. As an example, one member may be connected to the service of the social network and the communication device through internet service over a cellular signal while the other person may be connected to the same service through a WiFi® signal that provides internet access.

The exemplary embodiment also relates to a system/device for performing the operations discussed above. This system/apparatus/device may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A server configured to communicate with a first communication device of a first user and a second communication device of a second user over communication links comprising a cellular network, wherein the server comprises a processor configured to:

store in a data storage device a first profile associated with the first user and a second profile associated with a second user, both the first and the second profile comprises at least a picture and a name of their respective users thereby automatically eliminating anonymous communication of the first profile and the second profile between member devices without intervention by the first user or the second user;

associate each member profile with a unique hardware identification associated with the member devices;

identify a unique ID of a second member in the vicinity and spatial proximity of a first member and provide the first member with the profile of the second member comprising a picture and name to facilitate a connection between both members;

send the second member the profile of the first member including the picture and name upon the first member initiating an invite to the second member to connect over a networking service;

inform the first member if the second member has accepted or rejected the invite to connect initiated by the first member; and once the second member accepts the invite of the first member, store the connectivity between both members in the data storage device and facilitate a chat feature between them using respective devices connected to the server, wherein the first user and the second user are members of a same social network, and the processor is to disclose non-anonymous social network attributes including a picture, name, and location of the first user and the second user in a vicinity or within a predetermined distance from one another for the purpose of connecting members of the same social network based in part on proximity calculations between connecting members, wherein the server permits discoverable members to have their respective devices turned on or turned off at a time of a search being conducted by the first user, wherein the server permits the discoverable members to have their respective devices unconnected to an internet connection service at the time of the search being conducted by the first user, and wherein any of turned off devices and disconnected devices is discoverable by the server as the internet connection service is configured to report the any of turned off devices and disconnected devices as discoverable based on a latest static and dynamic location in proximity to the first user.

2. The server of claim 1, further comprising a context information retrieval module, which when executed by the one or more processors, provides the first and second communication devices with the profile related information beyond the first and second user information comprised in first and second invitations.

3. The server of claim 1, wherein the server is to communicate with a second server, and wherein the second server is to provide social networking services that operate independently of the server.

4. The server of claim 3, wherein the server is to receive profile related information from the second server.

5. The server of claim 3, wherein the server is to connect with a contact exchanging application executing on the first and second communication devices to execute services and features available with the server.

6. The server of claim 5, wherein the contact exchanging application is to store updated contacts information and profiles of user contacts including pictures.

7. The server of claim 5, wherein the server is to utilize the contact exchanging application of the first communication device to discover the second communication device present within the spatial proximity, and to present a picture and name of the second user associated with the second communication device on user interface of the first communication device before the first user deciding to send an invite to connect.

8. The server of claim 5, wherein the contact exchanging application is to present the second user with an option to accept or reject the invitation sent by the first user by sending to the server the acceptance or rejection response of the second user, and allowing the server to communicate the acceptance or rejection response to the first user.

9. A method for communicating a server with a first communication device of a first user and a second communication device of a second user over communication links comprising a cellular network, the method comprising:

storing, in a data storage device of the server, a first profile associated with the first user and a second profile associated with the second user, wherein both the first and second profiles comprise at least a picture and a name of their respective users thereby automatically eliminating anonymous communication of the first profile and the second profile between user devices without intervention by the first user or the second user;

associating each user profile with a unique hardware identifier associated with the users' devices;

identifying a unique hardware identifier of the second communication device within a spatial proximity of the first communication device;

based on the identification of the unique identifier, transmitting the second profile of the second user to the first communication device as an invitation to connect with the second communication device;

transmitting the first profile of the first user to the second communication device as an invitation to connect with the first communication device;

notifying the first communication device when the second user has accepted or rejected the invitation to connect the second communication device with the first communication device; and in response to the acceptance of the invitation by the second user, storing the connectivity information between both the first and second communication devices in the data storage device and facilitating a chat feature between the first and second users using the respective communication devices connected to the server, wherein the first user and the second user are members of a same social network, and the server is to disclose non-anonymous social network attributes including a picture, name, and location of the first user and the second user in a vicinity or within a predetermined distance from one another for the purpose of connecting members of the same social network based in part on proximity calculations between connecting members, wherein the server permits discoverable members to have their respective devices turned on or turned off at a time of a search being conducted by the first user, wherein the server permits the discoverable members to have their respective devices unconnected to an internet connection service at the time of the search being conducted by the first user, and wherein any of turned off devices and disconnected devices is discoverable by the server as the internet connection service is configured to report the any of turned off devices and disconnected devices as discoverable based on a latest static and dynamic location in proximity to the first user.

10. The method of claim 9, further comprising providing the first and second communication devices with the profile related information beyond the first and second user information comprised in the first and second invitations.

11. The method of claim 9, further comprising receiving profile related information from a networking server.

12. The method of claim 9, further comprising receiving profile related information from a networking server present in communication with the server.

13. The method of claim 9, further comprising connecting with a contact exchanging application executing on the first and second communication devices to execute services and features available with the server on the first and second communication devices.

14. The method of claim 13, further comprising discovering, using the contact exchanging application of the first communication device, the second communication device present within the spatial proximity, and presenting picture and name of the second communication device on user interface of the first communication device before the first user deciding to send an invite to connect.

15. The method of claim 13, further comprising presenting, by the contact exchanging application, an option to the second user to accept or reject the invitation sent by the first user, sending to the server the acceptance or rejection response of the second user, and letting the server communicate the acceptance or rejection response to the first user.

* * * * *